(12) United States Patent
Archambeau et al.

(10) Patent No.: US 9,677,222 B2
(45) Date of Patent: Jun. 13, 2017

(54) SELECTIVE TINTING METHOD

(71) Applicant: Essilor International (Compagnie Generale D'Optique), Charenton-le-Pont (FR)

(72) Inventors: Samuel Archambeau, Charenton-le-Pont (FR); Jérôme Ballet, Charenton-le-Pont (FR); Jean-Paul Cano, Charenton-le-Pont (FR); Stéphane Perrot, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 174 days.

(21) Appl. No.: 14/638,582

(22) Filed: Mar. 4, 2015

(65) Prior Publication Data

US 2015/0176202 A1   Jun. 25, 2015

Related U.S. Application Data

(62) Division of application No. 13/502,335, filed as application No. PCT/FR2010/052200 on Oct. 15, 2010, now Pat. No. 8,999,006.

(30) Foreign Application Priority Data

Oct. 21, 2009 (FR) ..................... 09 57390

(51) Int. Cl.
*D06P 5/00* (2006.01)
*B41M 5/26* (2006.01)
(Continued)

(52) U.S. Cl.
CPC ............... *D06P 5/00* (2013.01); *B41M 5/265* (2013.01); *C08J 7/06* (2013.01); *G02B 1/10* (2013.01);
(Continued)

(58) Field of Classification Search
CPC ............... D06P 5/00; B41M 5/265; C08J 7/06
(Continued)

(56) References Cited

U.S. PATENT DOCUMENTS

| 8,172,397 B2 | 5/2012 | Ballet et al. |
| 2008/0212017 A1 | 9/2008 | Ballet et al. |

(Continued)

FOREIGN PATENT DOCUMENTS

| EP | 0003191 A1 | 7/1979 |
| WO | 2009004265 A3 | 1/2009 |

*Primary Examiner* — Brent O'Hern
(74) *Attorney, Agent, or Firm* — Oblon, McClelland, Maier & Neustadt, L.L.P.

(57) ABSTRACT

A selective dyeing method is used for dyeing a substrate, selectively within a first exposed surface portion of said substrate. For this purpose, the substrate consists of a material that is impervious to a dye with the exception of the first portion of the exposed surface. In particular, the impervious material can form a layer which covers a base portion of the substrate in a second portion of the exposed surface. The substrate is heated such that the dye penetrates a pervious material which constitutes the first portion of the exposed surface. The method is particularly useful for eliminating light diffused by the walls of a multilayer structure which is supported by means of ocular glass.

11 Claims, 1 Drawing Sheet

(51) Int. Cl.
  *G02B 5/22* (2006.01)
  *C08J 7/06* (2006.01)
  *G02B 1/10* (2015.01)
  *B41M 3/00* (2006.01)

(52) U.S. Cl.
  CPC ............ *G02B 5/223* (2013.01); *B41M 3/003* (2013.01); *C08J 2367/02* (2013.01); *C08J 2369/00* (2013.01); *C08J 2379/08* (2013.01); *Y10T 428/24174* (2015.01); *Y10T 428/24942* (2015.01); *Y10T 428/249994* (2015.04)

(58) Field of Classification Search
  USPC ...................................................... 428/119
  See application file for complete search history.

(56) References Cited

U.S. PATENT DOCUMENTS

2009/0047424 A1\* 2/2009 Momma .............. B41M 5/0256
            427/162
2010/0007847 A1  1/2010 Cano et al.

\* cited by examiner

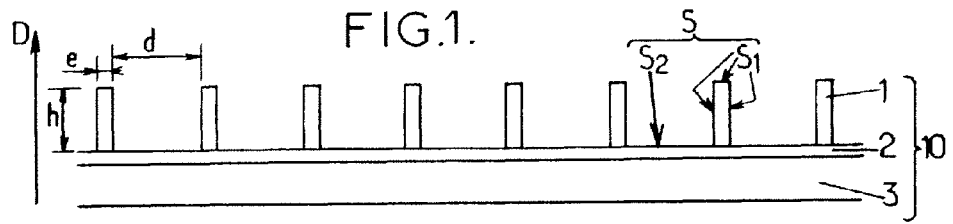
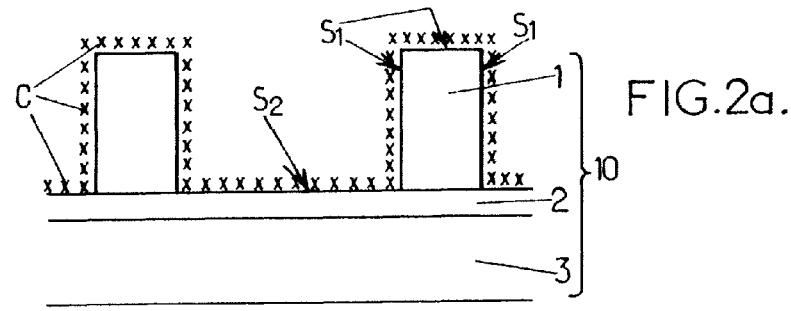
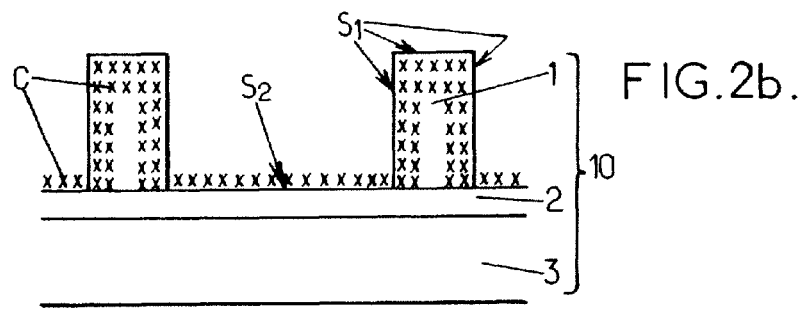
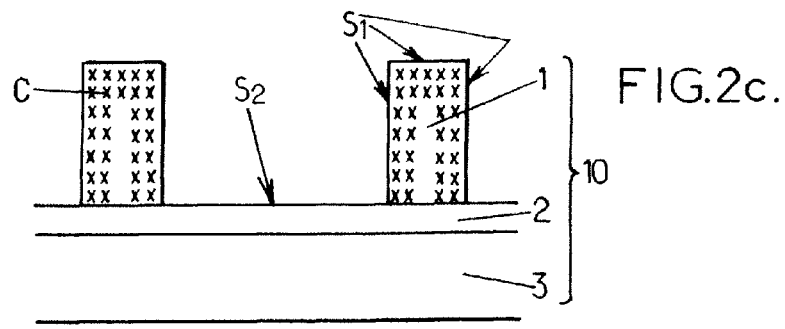
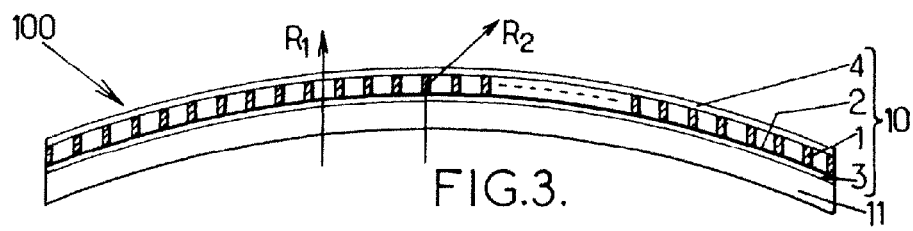

SELECTIVE TINTING METHOD

BACKGROUND

Technical Field

The invention relates to a method for selectively tinting a substrate. It also relates to a transparent cellular component resulting from such a method.

Description of the Related Art

It is often necessary to tint a substrate, selectively in a first portion of the surface of this substrate relative to a second portion of the surface of the same substrate. To this purpose, it is possible to mask off the second portion, apply the dye to the entire substrate, then remove the mask used. But such method is not possible when the substrate has on its surface complex structure and/or one with patterns of very small dimensions which prevent applying the mask. In addition, the steps of applying the mask onto the substrate and removing the mask may be time-consuming and incompatible with the target cost for a product incorporating the dyed substrate.

BRIEF SUMMARY

One object of the invention consists of tinting a substrate selectively between different portions of the substrate surface, in a manner which is compatible with a surface structure that is complex and/or has patterns of small dimensions.

Another object of the invention consists of selectively tinting a portion of the substrate surface in a fast and economical manner.

To achieve these and other objects, the invention proposes a selective tinting method which comprises the following steps:

/1/ providing a substrate which has an exposed surface, this exposed surface comprising a first surface portion formed by a first material and a second surface portion formed by a second material that is different from the first material;

/2/ providing a dye source which is adapted to release the dyes when the source is heated;

/3/ heating the dye source in proximity to the exposed surface of the substrate, so that dyes are transferred from the dye source onto the exposed surface of the substrate;

/4/ heating the substrate, so that the dyes which were transferred onto the first surface portion penetrate into the first material; and /5/ rinsing the exposed surface of the substrate with a dye solvent, so as to eliminate the dyes remaining on the exposed surface.

To implement the steps of this method, the second material is selected so that dyes originating from the dye source and present on the second surface portion at the start of step /4/ do not penetrate into the second material during this step /4/, and are eliminated in step /5/.

Thus, according to the invention, the tinting selectivity is obtained by appropriately choosing the substrate materials constituting the surface portion to be tinted and the surface portion which is not to be tinted. To this end, the first material which is used for the surface portion to be tinted, referred to as the first surface portion, is permeable to the dyes when the first material is heated. Simultaneously, the second material which is used for the surface portion which is not to be tinted, referred to as the second surface portion, is impermeable to the same dyes. The dyes therefore only diffuse into the first material when the substrate is heated, without penetrating into the second material. The dyes which remain on the substrate surface, at least on the second surface portion, are eliminated by rinsing so that only the dyes which have penetrated into the first material remain in the substrate.

Such method does not require using a mask to differentiate between the first and second portions of the substrate surface which is exposed.

In addition, these different steps, particularly the heating and rinsing of the substrate, are compatible with a structure that is complex and/or has patterns of small dimensions for the surface of this substrate.

Preferably, the second material may have a gelation or softening temperature which is higher than that of the first material. Indeed, an empirical correlation has been observed by the inventors between the permeability of a material to dyes and its softening when heated. In this sense, the second material is said to be impermeable to dyes in comparison to the first material.

Preferably, the first material may be an organic or a mineral-organic hybrid material. In the context of the invention, mineral-organic material is understood to mean a material which comprises at least two components, one being organic and the other being mineral in nature. Such a mineral-organic material may consist of mineral grains, for example grains of at least one metal oxide, distributed in an organic matrix which ensures the cohesion of the material. In this case, the softening of the first material corresponds to the softening of its organic matrix. In particular, the grains may be grains of silica ($SiO_2$).

The second material may be a mineral or a mineral-organic hybrid material. Dyes generally diffuse very little or not at all within a mineral material, or at least they diffuse less quickly in such a mineral material than in an organic material. For example, the second material may comprise silica ($SiO_2$), zinc oxide (ZnO), or tin-doped indium oxide (ITO). It may also be a hybrid mineral-organic material which incorporates silica, zinc oxide, or tin-doped indium oxide.

When both the first and second materials are hybrids with mineral grains distributed in their respective organic matrices, the matrix of the second material preferably has a gelation or softening temperature which is higher than that of the matrix of the first material.

In general, the dye source may be adapted to release the dyes in step /3/ by sublimation, so these dyes are in gaseous form during their transfer between the source and the exposed surface of the substrate. Alternatively, the dye source may be adapted so that the dyes are transferred during a contact between this source and the exposed surface of the substrate, which occurs in step /3/, The dye source is then removed between steps /3/ and /4/, These different types of dye sources are particularly compatible with an exposed surface of the substrate which is complex and/or has patterns of small dimensions. In particular, they do not require using a dye applicator which must be able to follow the contours of the exposed surface of the substrate in order to deposit the dye molecules. For example, the dye source may comprise a portion of paper or polyvinyl alcohol, impregnated with the dyes.

In a preferred implementation of the invention, the substrate may comprise:

a base substrate which is transparent, with an upper surface;

a transparent layer of the second material, which is supported by the upper surface of the base substrate; and a network of walls which is arranged on the transparent layer of the second material, on a side of said second material opposite the base substrate, with walls which extend perpendicularly to the upper surface of the base substrate.

The first portion of exposed surface is then formed by the walls, and the second portion of exposed surface is formed by the transparent layer of the second material between the walls. In this case, the method allows maintaining the transparency of the substrate between the walls. In addition, the base substrate may be of any material, as the impermeability of the substrate to dyes, between the walls, is ensured by the transparent layer. An appropriate choice of material for this layer therefore provides protection against dye penetration or diffusion for the base substrate.

In particular, the walls may be of resin, particularly of photoresist. In this case, the substrate may be heated in step /4/ for at least one hour at a temperature which is between 110° and 150° C.

The resin of the walls may therefore be organic or mineral-organic.

The base substrate may be of polyethylene terephthalate (PET).

The transparent layer may consist of one of the second materials cited above. It may have a thickness which is between 50 and 1000 nm (nanometers), preferably between 100 and 500 nm, measured perpendicularly to the upper surface of the base substrate. Such a thickness is effective for preventing contact between the dyes and the base substrate.

The invention also proposes a transparent cellular component which allows a clear vision through this component, and which can be obtained according to a method as described above. Such a component may comprise the base substrate, the transparent layer, and the network of walls. In the component, the walls incorporate dyes in a distribution within the walls which corresponds to a diffusion profile from a surface of the walls, and the transparent layer is without dyes. Such a component may form at least a portion of an eyeglass lens, a mask lens, an optical lens, a helmet visor, an aircraft window, or a glazing, or may form at least a portion of a multilayer structure which is adapted to be applied onto an eyeglass lens, a mask lens, an optical lens, a helmet visor, an aircraft window, or a glazing.

BRIEF DESCRIPTION OF THE SEVERAL VIEWS OF THE DRAWINGS

Other features and advantages of the invention will be apparent from the following description of a non-limiting example, with reference to the attached drawings in which:

FIG. 1 is a cross-sectional view of a substrate to which a method of the invention can be applied;

FIGS. 2a-2c are enlarged cross-sectional views of the substrate of FIG. 1, in several steps of a method of the invention; and FIG. 3 illustrates a specific application of the substrate of the above figures.

For sake of clarity, the dimensions of the elements represented in these FIGS. do not correspond to actual dimensions or to actual dimension ratios. In addition, identical references indicated in different FIGS. denote identical elements.

DETAILED DESCRIPTION

The invention is now described for illustrative purpose in the context of an ophthalmic application, but it is understood that it may be applied to other technical fields.

The invention is particularly suitable for tinting a component forming a substrate, when this component is initially transparent and must remain transparent after having been tinted. In the context of the invention, transparent component is understood to mean an optical component which allows a user positioned on one side of the component to see distinctly, through this component, objects positioned on another side and at a distance from the component. In other words, an image of an object is formed on the retina of the user by the light propagated over a first non-zero distance between the object and the transparent component, then passes through the transparent component and is propagated over a second non-zero distance between the transparent component and the user's eye. To this end, the diffusion and/or diffraction of the light caused by the optical component must be sufficiently low so that the image of a point of the object, through the transparent component, appears as a point and not a diffuse spot in the image perceived by the user.

For example, the transparent component to which the invention is applied may be an eyeglass lens, or a multilayer structure intended to be applied to such an eyeglass lens.

As illustrated in FIG. 1, such a multilayer structure 10 may comprise:

a transparent film 3 of polyethylene terephthalate (PET), polycarbonate (PC), or polyimide, with a thickness of 50 μm (micrometers) for example, and which forms a base substrate for the structure 10;

a layer 2 which covers an upper surface of the film 3; and a network of walls 1 which is formed on the layer 2, with walls 1 which extend substantially perpendicularly to the film 3.

The layer 2 is preferably continuous and may be formed on the film 3 using a thin film deposition method, such as low-pressure plasma deposition or RF plasma-assisted deposition for an oxide. A sol-gel method may alternatively be used when the layer 2 consists of a hybrid material. The layer 2 may be of silica ($SiO_2$) for example, of sufficient thickness to be continuous. The thickness of the layer 2 may be between 0.1 and 0.5 μm.

The walls 1 may be at least partially of an organic material, such as a resin, particularly a photoresist, each with a height h of 20 μm and a thickness e that is greater than 0.1 μm, preferably between 0.5 and 8 μm. Two neighboring walls 1 may be separated by a distance d which is between 50 μm and 1.5 mm for example, parallel to the film 3. In addition, mineral grains, such as grains of a metal oxide, may be incorporated into the resin of the walls 1, so that they are embedded in it. The resulting material constituting the walls 1 is then mineral-organic in nature.

The structure 10 is transparent to light rays which propagate in the direction D perpendicular to the film 3. In particular, the film 3 and the layer 2 are individually transparent.

The structure 10 then possesses an exposed surface S, formed in part by the walls 1 and in part by the layer 2 between the walls 2. The walls 1 therefore form a first portion of the surface S, denoted $S_1$, and the portions of the layer 2 which are exposed between the walls 1 forms a second portion of the surface S, denoted $S_2$. The material of the walls 1 constitutes the first material as designated in the general part of the present patent application, and the material of the layer 2 constitutes the second material.

A dye source (not represented) is brought close to the exposed surface S. This dye source is adapted to release molecules C of at least one dye when it is heated. Such dye sources, referred to as dye sublimation sources, are well known to a person skilled in the art and it is unnecessary to further discuss their operation here. For example, the dye may be contained in a crucible arranged near the structure 10, or may be a powder or a liquid which is applied to the surface S. More generally, the invention may be applied to a mixture of multiple dyes. In this case, each dye can be transferred onto the structure 10 in the manner described, individually from a separate source or from a source of the mixture. For clarity sake, it is assumed in the following description that a single dye is used.

The dye source is heated so that it releases the dye molecules C and these latter are deposited on the exposed surface S of the structure 10. The heating temperature and duration for the dye source are selected so that a sufficient quantity of dye molecules C cover the surface S in a substantially continuous and uniform manner, particularly on the sides of the walls 1 which are perpendicular to the film 3. As illustrated in FIG. 2a, dye molecules C are thus deposited at the same time on the first portion $S_1$ and on the second portion $S_2$ of the surface S. However, the film 3 is not in contact with the dye molecules C, as it is covered by the layer 2 between the walls 1.

The dye source C is removed, then the structure 10 itself is heated, to activate a diffusion of the dye molecules C into the material of the walls 1. The temperature of the heated structure 10 may be selected to soften the resin of the walls 1. However, this heating temperature remains fairly low so that the walls 1 are not deformed. For example, the structure 10 may be heated to a temperature which is between 110° C. and 150° C. The dye molecules C then penetrate into the walls 1, from their side faces and top ends which form the surface portion $S_1$.

The material of the walls 1 was therefore selected to be permeable to the dye molecules C, in order to facilitate the diffusion of these molecules into the walls 1. The walls 1 then incorporate dye molecules C in a distribution which has the diffusion profile produced from the side and top ends of these walls (FIG. 2b).

The material of the layer 2 was selected to be tight, or impermeable, to the dye molecules. Thus the dye molecules C which are present on the second surface portion $S_2$ remain outside the layer 2 during the heating of the structure 10, without penetrating into the layer 2. In particular, the material of the layer 2 may be selected so that it is not softened by the heating of the structure 10. To this end, it has a softening temperature which is higher than that of the material of the walls 1. Thus, the film 3 remains without contact with the dye molecules C, although the constituting material of the film 3 may have an affinity for the dye used. In particular, dye molecules would diffuse into polyethylene terephthalate if the film 3 were in contact with the dye molecules C. In other words, the layer 2 constitutes an efficient barrier to protect the film 3 from the dye molecules C.

During a last step which is illustrated in FIG. 2c, the structure S is rinsed with a solvent for the dye molecules C. Water may be used for this rinse, for example. The dye molecules C which remain on the exposed surface S are thus eliminated. In this manner, all the dye molecules C which are present on the second surface portion $S_2$ are removed, so that the structure 10 is not tinted between the walls 1. Any excess dye molecules C remaining on the first surface portion $S_1$ are removed at the same time. However, the remaining dye molecules C which had diffused into the material of the walls 1 are not in contact with the rinsing solvent, and they permanently tint the walls 1. Thus a selective tinting of the walls 1 is achieved, relative to the film 3.

After the method of the invention has been applied, the structure 10 is absorbing for the light rays passing through the walls 1 and is transparent between the walls 1, with a high level of light transmission in the second surface portion $S_2$. In particular, the final light transmission in this second surface portion $S_2$ may be substantially equal to the initial value of the light transmission of the film 3 covered by the layer 2.

In a particular application of the structure 10 tinted as described above, a transparent optical substance may then be introduced between the walls 1, up to the tops of these walls. Then a transparent sealing film 4 may be applied onto the structure 10 as represented in FIG. 3, for example by affixing it to the top ends of the walls 1. The structure 10 is thus sealed in a tight manner, and permanently contains the transparent optical substance.

The structure 10 may then be applied onto an eyeglass lens 11, for example onto the convex optical face of this lens. The assembly allows providing additional functions to the final eyeglass lens 100, produced by the transparent substance. For example, this substance may be photochromic.

The eyeglass lens 100 is still transparent to a light ray $R_1$ which passes through it between two walls 1. Indeed, the ray $R_1$ successively crosses the lens 11, the film 3, the layer 2, a portion of the optical substance which is contained between two walls 1, and the sealing film 4, which are all transparent with a high light transmission value.

However, a light ray $R_2$ which traverses the lens 100 by passing through one of the walls 1 may be deviated by the diffusion of the light, because of the small thickness e of this wall. A reduction of the lens 100 transparency would result, in the sense that was mentioned at the start of this description, providing a blurred vision for a user of this lens. But, as the material of the wall 1 has been tinted, it is absorbing so that the light intensity associated with the diffused ray $R_2$ is low, and even very low. The ray $R_2$ therefore does not contribute to the image formed of an object through the lens 100.

By using the selective tinting method of the invention, the eyeglass lens 100 is still transparent, without a portion of the light transmitted through the lens being diffused or diffracted. The haze amount of the lens 100 can thus be less than 1%. The lens 100 therefore provides the lens user with a clear vision.

The invention claimed is:

1. A transparent cellular component allowing a clear vision through said component and comprising:
   a transparent base substrate having an upper surface;
   a transparent first material formed on the upper surface of the base substrate; and
   a transparent second material formed on the first material, wherein the first material has a gelation or softening temperature that is greater than a gelation or softening temperature of the second material, the first material is more impermeable to dye at a temperature below the gelation or softening temperature of the first material than is the second material above the gelation or softening temperature of the second material, and the second material is more permeable to the dye at a temperature above the gelation or softening temperature of the second material than is the first material below the gelation or softening temperature of the first material, such that at a dyeing temperature between the gelation or softening temperature of the first material and the gelation or softening temperature of the second material, presence of the dye will simultaneously dye the second material and while not dyeing the first material.

2. The transparent cellular component of claim 1, wherein the first material forms a transparent layer having opposite first and second sides, the second side facing the base substrate, and the second material forms a network of walls arranged on the first side of the transparent layer, the walls extending perpendicularly to the upper surface of the base substrate.

3. The transparent cellular component of claim 1, wherein the second material incorporates dyes and the first material is without dyes.

4. The transparent cellular component of claim 3, wherein a distribution of said dyes inside the second material corresponds to a diffusion profile from a surface of said second material.

5. A transparent cellular component allowing a clear vision through said component and comprising:
a transparent base substrate having an upper surface;
a transparent first material supported by the upper surface of the base substrate and having opposite first and second sides, the second side facing the upper surface of the base substrate; and
a transparent second material disposed on the first side of the first material, having walls extending perpendicularly to the upper surface of the base substrate,
wherein the second material incorporate dyes in a distribution of said dyes inside the second material corresponding to a diffusion profile from a surface of said second material, and wherein the first material is without dyes.

6. The transparent cellular component according to claim 5, wherein the first material has a gelation or softening temperature that is greater than a gelation or softening temperature of the second material.

7. The transparent cellular component according to claim 5, wherein the second material is an organic material or a mineral-organic hybrid material, and the first material is a mineral material or a mineral-organic hybrid material.

8. The transparent cellular component according to claim 7, wherein the first material comprises silica, zinc oxide, tin-doped indium oxide, or a hybrid material incorporating silica, zinc oxide, or tin-doped indium oxide.

9. The transparent cellular component according to claim 5, wherein the second material comprises a photoresist resin.

10. The transparent cellular component according to claim 5, forming at least a portion of an eyeglass lens, a mask lens, an optical lens, a helmet visor, an aircraft window, or a glazing, or forming at least a portion of a multilayer structure configured to be applied onto an eyeglass lens, a mask lens, an optical lens, a helmet visor, an aircraft window, or a glazing.

11. The transparent cellular component according to claim 5, wherein the second material forms a network of walls disposed on the first side of the first material, walls of the network of walls extending perpendicularly to the upper surface of the base substrate.

* * * * *